(12) United States Patent
Moon et al.

(10) Patent No.: US 9,979,057 B2
(45) Date of Patent: May 22, 2018

(54) CYLINDRICAL LITHIUM ION SECONDARY BATTERY

(71) Applicant: SAMSUNG SDI CO., LTD., Yongin-si, Gyeonggi-do (KR)

(72) Inventors: Jinyoung Moon, Yongin-si (KR); Byoungmin Chun, Yongin-si (KR); Shinjung Kim, Yongin-si (KR); Yongtae Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 142 days.

(21) Appl. No.: 14/958,956

(22) Filed: Dec. 4, 2015

(65) Prior Publication Data

US 2016/0204485 A1 Jul. 14, 2016

(30) Foreign Application Priority Data

Jan. 8, 2015 (KR) ........................ 10-2015-0002808

(51) Int. Cl.
| | | |
|---|---|---|
| *H01M 14/00* | (2006.01) |
| *H01M 10/50* | (2006.01) |
| *H01M 2/12* | (2006.01) |
| *H01M 10/637* | (2014.01) |
| *H01M 2/02* | (2006.01) |
| *H01M 2/04* | (2006.01) |
| *H01M 2/34* | (2006.01) |
| *H01M 10/0525* | (2010.01) |

(Continued)

(52) U.S. Cl.
CPC ......... *H01M 10/637* (2015.04); *H01M 2/022* (2013.01); *H01M 2/0237* (2013.01); *H01M 2/046* (2013.01); *H01M 2/0413* (2013.01); *H01M 2/348* (2013.01); *H01M 10/052* (2013.01); *H01M 10/0525* (2013.01); *H01M 10/0587* (2013.01); *H01M 10/4257* (2013.01); *H01M 2/023* (2013.01); *H01M 10/0422* (2013.01); *H01M 10/0431* (2013.01); *H01M 2200/106* (2013.01); *Y02T 10/7011* (2013.01)

(58) Field of Classification Search
CPC . H01M 2/12; H01M 2200/106; H01M 2/0426
See application file for complete search history.

(56) References Cited

U.S. PATENT DOCUMENTS

| | | | |
|---|---|---|---|
| 5,376,467 A | 12/1994 | Abe et al. |
| 2009/0123831 A1 | 5/2009 | Kim |
| 2010/0159288 A1 | 6/2010 | Kim |

FOREIGN PATENT DOCUMENTS

| | | |
|---|---|---|
| JP | 05-251076 A | 9/1993 |
| JP | 2005-123060 A | 5/2005 |

(Continued)

OTHER PUBLICATIONS

Extended European Search Report dated Apr. 14, 2016.

*Primary Examiner* — Ula C Ruddock
*Assistant Examiner* — Julian Anthony
(74) *Attorney, Agent, or Firm* — Lee & Morse, P.C.

(57) ABSTRACT

A cylindrical lithium ion secondary battery, including a cylindrical can; an electrode assembly in the cylindrical can with an electrolyte solution; and a cap assembly sealing the cylindrical can, the cap assembly including a positive temperature coefficient (PTC) device connected to the electrode assembly, a cap-up connected to the PTC device, solder between the PTC device and the cap-up, and an exterior space without the solder on external circumferences of the PTC device and the cap-up.

9 Claims, 9 Drawing Sheets

(51) Int. Cl.
*H01M 10/052* (2010.01)
*H01M 10/0587* (2010.01)
*H01M 10/42* (2006.01)
H01M 10/04 (2006.01)

(56) References Cited

FOREIGN PATENT DOCUMENTS

| | | | |
|---|---|---|---|
| JP | 2009-266530 A | 11/2009 |
| KR | 10-2006-0118722 A | 11/2006 |
| KR | 10-2012-0103394 A | 9/2012 |
| KR | 10-2013-0025198 A | 3/2013 |
| WO | WO 2012/086526 A1 | 6/2012 |

CYLINDRICAL LITHIUM ION SECONDARY BATTERY

CROSS-REFERENCE TO RELATED APPLICATION

Korean Patent Application No. 10-2015-0002808, filed on Jan. 8, 2015, in the Korean Intellectual Property Office, and entitled: "Cylindrical Lithium Ion Secondary Battery," is incorporated by reference herein in its entirety.

BACKGROUND

1. Field

Embodiments provide a cylindrical lithium ion secondary battery.

2. Description of the Related Art

Lithium ion secondary batteries may exhibit, for example, a high operating voltage and a high energy density per unit weight, and may be used in portable electronic devices and power sources of hybrid automobiles or electric vehicles.

SUMMARY

Embodiments may be realized by providing a cylindrical lithium ion secondary battery, including a cylindrical can; an electrode assembly in the cylindrical can with an electrolyte solution; and a cap assembly sealing the cylindrical can, the cap assembly including a positive temperature coefficient (PTC) device connected to the electrode assembly, a cap-up connected to the PTC device, solder between the PTC device and the cap-up, and an exterior space without the solder on external circumferences of the PTC device and the cap-up.

The exterior space may have a width in a range of 0.1 mm to 1.5 mm.

The cap-up may include an exterior stepped portion protruding toward the exterior space and contacting the PTC device.

A width of the exterior stepped portion may be equal to that of the exterior space.

The exterior stepped portion may include a plurality of stepped portions spaced apart from each other.

The exterior stepped portion may include a plurality of serrations.

A top surface of the cap-up corresponding to the PTC device may be planar.

A top surface of the cap-up corresponding to the PTC device may be bent.

The cap assembly may further include an interior space without solder on internal circumferences of the PTC device and the cap-up.

The cap-up may include an interior stepped portion protruding toward the interior space and contacting the PTC device.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
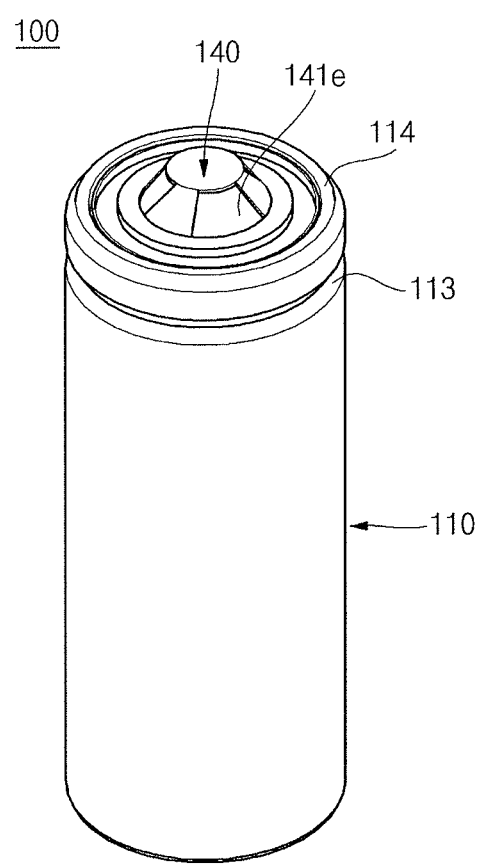
FIGS. 1A, 1B and 1C illustrate a perspective view, a cross-sectional view and an exploded perspective view of a cylindrical lithium ion secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, thicknesses of layers and regions may be exaggerated for clarity. Like numbers refer to like elements throughout. As used herein, the term "and/or" includes any and all combinations of one or more of the associated listed items.

The terminology used herein is for the purpose of describing particular embodiments and is not intended to be limiting. As used herein, singular forms are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

In addition, it will be understood that when an element A is referred to as being "connected to" an element B, the element A can be directly connected to the element B or another element C may be present between the elements A and B and the elements A and B may be indirectly connected to each other.

It will be understood that, although the terms first, second, etc., may be used herein to describe various elements, components, regions, and/or sections, these elements, components, regions, and/or sections should not be limited by these terms. These terms are only used to distinguish one element, component, region or section from another element, component, region or section. Thus, a first element, component, region or section discussed below could be termed a second element, component, region or section.

The term "solder" or "solder paste" used herein may refer to a connection member reflowed in a temperature range of about 180° C. to about 250° C. to electrically connect a cap-up and a positive temperature coefficient (PTC) device. In an example embodiment, the connection member may be formed of, for example, a eutectic solder, such as $Sn_{37}Pb$, a high lead solder, such as $Sn_{95}Pb$, or a lead-free solder, such as SnAg, SnAu, SnCu, SnZn, SnZnBi, SnAgCu, or SnAgBi. For example, the solder may include a tin (Sn) free connection member and others not listed herein.

Figure 1B:
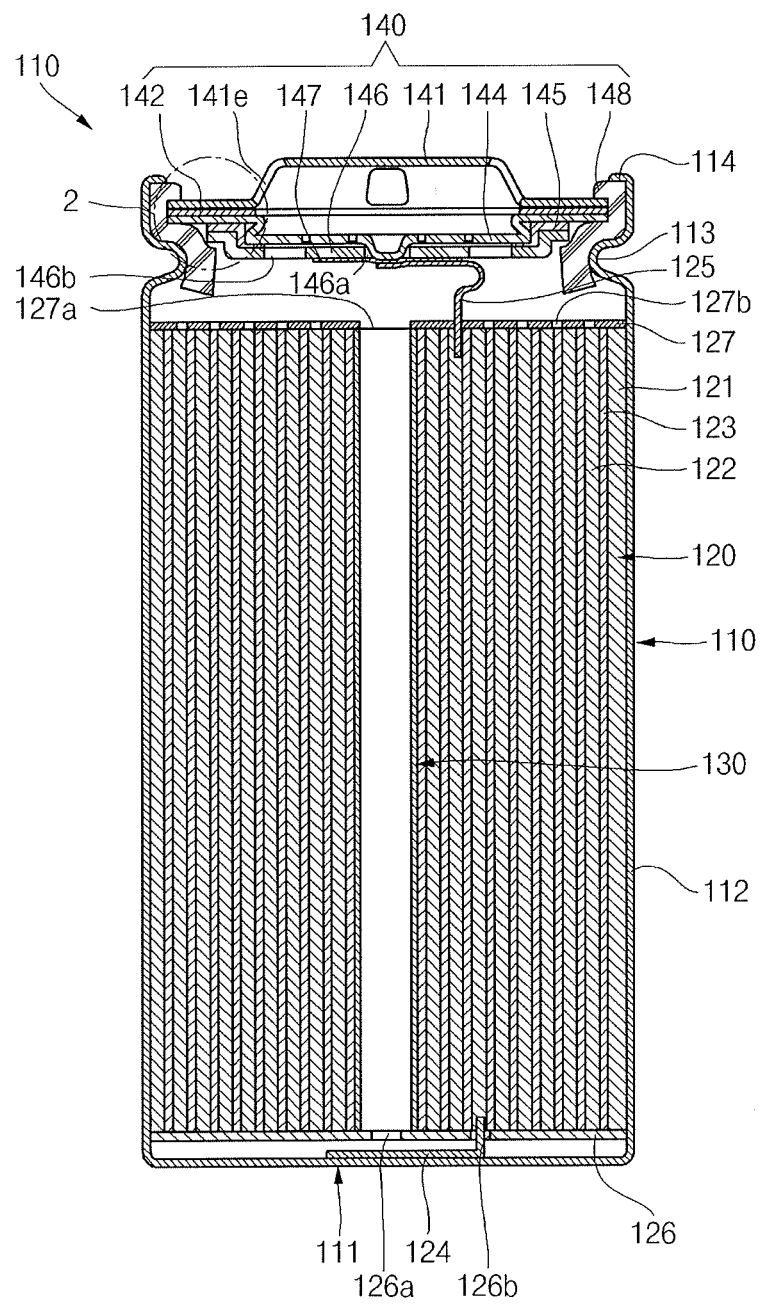
Figure 1C:
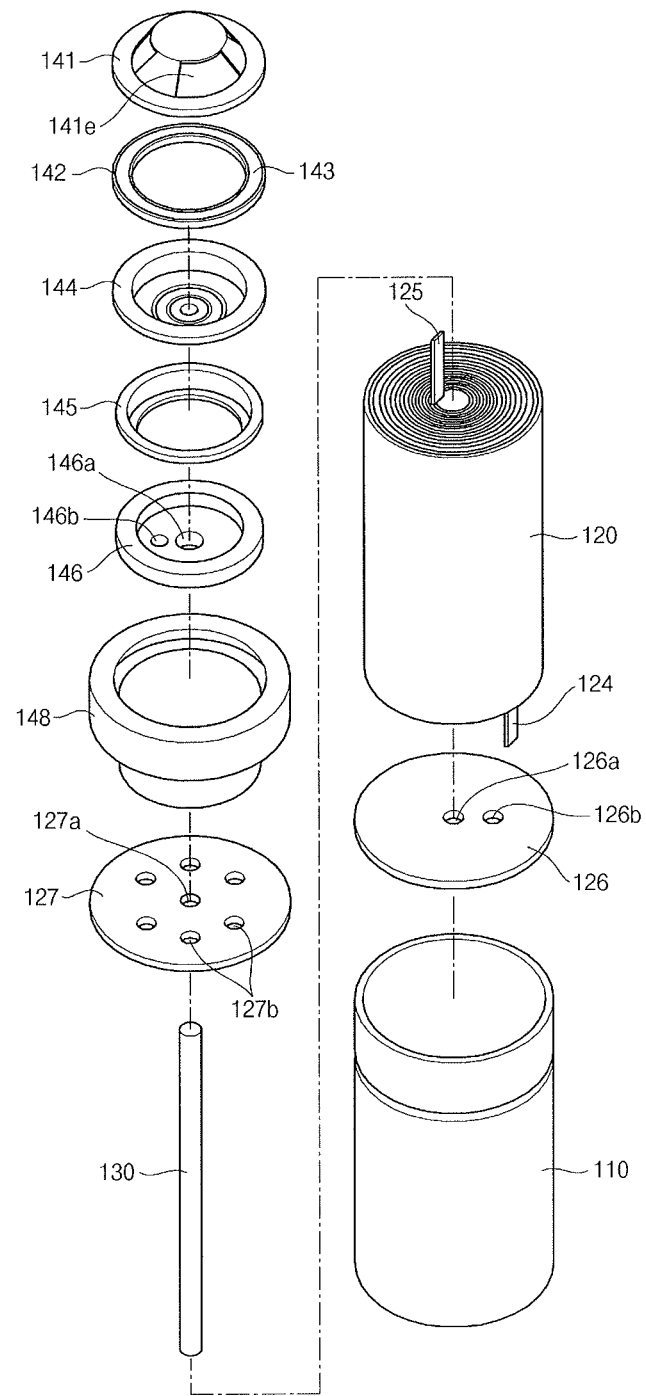

Referring to FIGS. 1A, 1B and 1C, a perspective view, a cross-sectional view and an exploded perspective view of a cylindrical lithium ion secondary battery according to an embodiment are illustrated.

As illustrated in FIGS. 1A to 1C, the cylindrical lithium ion secondary battery 100 according to an embodiment may include a cylindrical can 110, an electrode assembly 120, a center pin 130, and a cap assembly 140.

The cylindrical can 110 may include a circular bottom portion 111 and a side portion 112 upwardly extending by a predetermined length from the bottom portion 111. In the course of manufacturing the secondary battery, a top portion of the cylindrical can 110 may be opened, and during assembling of the secondary battery, the electrode assembly 120 and the center pin 130 may be inserted into the cylindrical can 110 together with an electrolyte. The cylindrical can 110 may be made of, for example, steel, stainless steel, aluminum, or an aluminum alloy. The cylindrical can 110 may include an inwardly recessed beading part 113 formed at a lower portion of the cap assembly 140 to help prevent the cap assembly 140 from being deviated to the outside, and an inwardly bent crimping part 114 formed at an upper portion of the cap assembly 140.

The electrode assembly 120 may be accommodated in the cylindrical can 110. The electrode assembly 120 may include a negative electrode plate 121 coated with a negative electrode active material (e.g., graphite or carbon), a positive electrode plate 122 coated with a positive electrode active material (e.g., a transition metal oxide, such as $LiCoO_2$, $LiNiO_2$, or $LiMn_2O_4$), and a separator 123 positioned between the negative electrode plate 121 and the positive electrode plate 122 to help prevent an electric short and allowing only movement of lithium ions. The negative electrode plate 121, the positive electrode plate 122 and the separator 123 may be wound up in a substantially cylindrical shape. In an example embodiment, the negative electrode plate 121 may be made of a copper (Cu) foil, and the positive electrode plate 122 may be made of an aluminum (Al) foil, and the separator 123 may be made of polyethylene (PE) or polypropylene (PP). A negative electrode tab 124 projected downwardly and extending with a predetermined length may be welded to the negative electrode plate 121 and a positive electrode tab 125 projected upwardly with a predetermined length may be welded to the positive electrode plate 122, and vice versa. In an example embodiment, the negative electrode tab 124 may be made of nickel (Ni) and the positive electrode tab 125 may be made of aluminum (Al).

The negative electrode tab 124 of the electrode assembly 120 may be welded to the bottom portion 111 of the cylindrical can 110, and the cylindrical can 110 may function as a negative electrode. In an embodiment, the positive electrode tab 125 may be welded to the bottom portion 111 of the cylindrical can 110, and the cylindrical can 110 may function as a positive electrode.

A first insulating plate 126 coupled to the cylindrical can 110 and having a first hole 126a formed at its central portion and a second hole 126b formed at its exterior side may be interposed between the electrode assembly 120 and the bottom portion 111. The first insulating plate 126 may prevent the electrode assembly 120 from electrically contacting the bottom portion 111 of the cylindrical can 110. For example, the first insulating plate 126 may prevent the positive electrode plate 122 of the electrode assembly 120 from electrically contacting the bottom portion 111. A large amount of gas may be generated, for example, due to an abnormality in the secondary battery, and the first hole 126a may allow the gas to rapidly move upwardly through the center pin 130, and the second hole 126b may allow the negative electrode tab 124 to pass through the same to be welded to the bottom portion 111.

A second insulating plate 127 coupled to the cylindrical can 110 and having a first hole 127a formed at its central portion and a plurality of second holes 127b formed at its exterior side may be interposed between the electrode assembly 120 and the bottom portion 111. The second insulating plate 127 may prevent the electrode assembly 120 from electrically contacting the cap assembly 140. For example, the second insulating plate 127 may prevent the negative electrode plate 121 of the electrode assembly 120 from electrically contacting the cap assembly 140. A large amount of gas may be generated, for example, due to an abnormality in the secondary battery, and the first hole 127a may allow the gas to rapidly move to the cap assembly 140, and the second holes 127b may allow the positive electrode tab 125 to pass through the same to be welded to the cap assembly 140. In an electrolyte injection process, the second holes 127b may allow the electrolyte to rapidly flow into the electrode assembly 120.

Diameters of the first holes 126a and 127a of the first and second insulating plates 126 and 127 may be smaller than a diameter of the center pin 130, and it may be possible to prevent the center pin 130 from electrically contacting the bottom portion 111 of the cylindrical can 110 or the cap assembly 140, for example, due to an external shock.

The center pin 130 may be in the shape of a hollow cylindrical pipe and may be coupled to a substantially central portion of the electrode assembly 120. The center pin 130 may be made of, for example, steel, stainless steel, aluminum, an aluminum alloy, or polybutylene terephthalate. The center pin 130 may prevent the electrode assembly 120 from being deformed during charging or discharging of the secondary battery, and may serve as a path of gas movement. In some cases, the center pin 130 may not be provided.

The cap assembly 140 may include a cap-up 141 having a plurality of through-holes 141e, a positive temperature coefficient (PTC) device 142 installed under the cap-up 141, a safety plate 144 formed under the PTC device 142, an insulating plate 145 installed under the safety plate 144, a cap-down 146 installed under the safety plate 144 and the insulating plate 145 and having first and second through-holes 146a and 146b, a sub-plate 147 fixed on a bottom surface of the cap-down 146 and electrically connected to the positive electrode tab 125, and an insulation gasket 148 insulating the cap-up 141, the safety plate 144, the insulating plate 145, the cap-down 146 and a side portion 111 of the cylindrical can 110.

The insulation gasket 148 may be compressed between the beading part 113 formed on the side portion 111 of the cylindrical can 110 and the crimping part 114. The through-holes 141e, 146a, and 146b formed in the cap-up 141 and the cap-down 146 may discharge internal gas to the outside when an internal pressure of the cylindrical can 110 increases, for example, due to an abnormality in the secondary battery. The internal pressure may make the safety plate 144 upwardly reversed and electrically separated from the sub-plate 147. Then, the safety plate 144 may be ruptured and the internal gas may be discharged to the outside.

The cap-up 141 and the PTC device 142 may be electrically connected to each other by the solder 143. Resistance of the PTC device 142 may be increased according to an increase in the temperature, the PTC device 142 may prevent current or over-current from flowing, and the secondary battery may be kept in a stable state. The relationship between each of the cap-up 141, the PTC device 142 and the solder 143 will later be described in more detail.

An electrolyte (not shown) may be injected into the cylindrical can 110 and may allow movement of lithium ions generated by an electrochemical reaction in the negative electrode plate 121 and the positive electrode plate 122 during charging and discharging of the battery. The electrolyte may be a non-aqueous organic electrolyte including a mixture of a lithium salt and high-purity organic solvent. The electrolyte may be, for example, a polymer using, e.g., including, a solid electrolyte.

Figure 2:
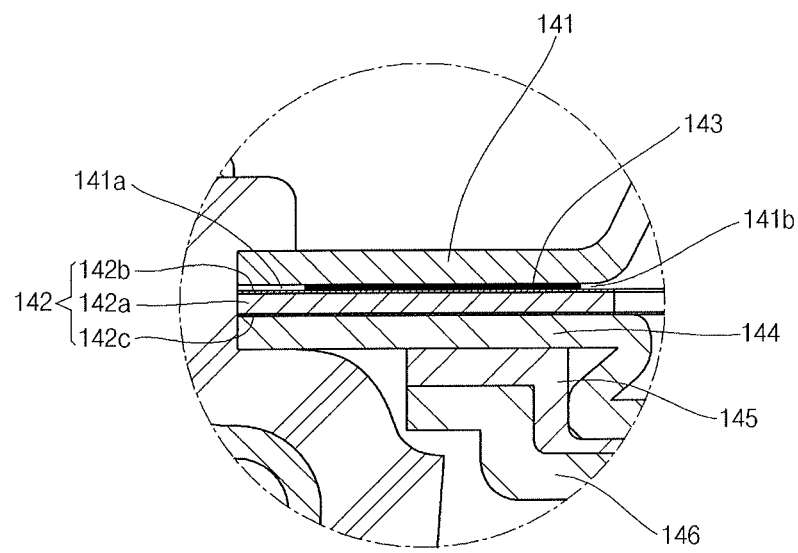
FIG. 2 illustrates an enlarged cross-sectional view of a region 2 of FIG. 1B.

Referring to FIG. 2, an enlarged cross-sectional view of a region 2 of FIG. 1B is illustrated.

As illustrated in FIG. 2, the cap assembly 140 may include the PTC device 142 electrically connected to the electrode assembly 120, and the cap-up 141 electrically connected to the PTC device 142. The cap assembly 140 may further include the solder 143 coated between the PTC device 142 and the cap-up 141 and reflowed to then be cured. The PTC device 142 and the cap-up 141 may be electrically connected to each other by the solder 143. The safety plate 144 and the cap-down 146 may further be provided between the PTC device 142 and the electrode assembly 120. The safety plate 144 may be electrically connected to a bottom portion of the PTC device 142, the cap-down 146 and the sub-plate 147 may be electrically connected to the safety plate 144, the positive electrode tab 125 may be electrically connected to the sub-plate 147, and the positive electrode tab 125 may be electrically connected to the electrode assembly 120.

The PTC device 142 may include a device portion 142a, a top conductive pattern 142b formed on a top surface of the device portion 142a, and a bottom conductive pattern 142c formed on a bottom surface of the device portion 142a. As described above, the resistance may be increased when the temperature of the secondary battery rises, and the PTC device 142 may prevent charge or discharge current from flowing.

An exterior space 141a without the solder 143 formed along external circumferences of the cap-up 141 and the PTC device 142 may further be provided. The exterior space 141a having a hollow interior inwardly extending a predetermined length or width from the external circumferences of the cap-up 141 and the PTC device 142 may further be formed.

A horizontal length of the exterior space 141a may be in a range of about 0.1 mm to about 1.5 mm. If the horizontal length of the exterior space 141a is smaller than about 0.1 mm, the solder 143 may flow, e.g., flow up, to the external circumferences of the cap-up 141 and the PTC device 142 during a reflow process, the cap-up 141 may be directly short-circuited to an unwanted region of the PTC device 142 and/or the safety plate 144, and current or over-current may be prevented from being cut off. If the horizontal length of the exterior space 141a is greater than about 1.5 mm, the external circumference of the cap-up 141 may be bent during a crimping process, and internal sealing efficiency of the secondary battery may be lowered.

An interior space 141b without the solder 143 formed along internal circumferences of the cap-up 141 and the PTC device 142 may further be provided. The interior space 141b having a hollow interior outwardly extending a predetermined length from the internal circumferences of the cap-up 141 and the PTC device 142 may further be formed.

The predetermined length of the interior space 141b may be in a range of about 0.1 mm to about 0.4 mm. If the length of the interior space 141b is smaller than about 0.1 mm, the solder 143 may flow up to the internal circumferences of the cap-up 141 and the PTC device 142 during a reflow process, the cap-up 141 may be directly short-circuited to an unwanted region of the PTC device 142 and/or the safety plate 144, and current or over-current may be prevented from being cut off. If the length of the interior space 141b is greater than about 0.4 mm, an electrically connected region between the cap-up 141 and the PTC device 142 may be reduced, and electrical resistance may be increased.

Even if the width of the interior space 141b is smaller than about 0.1 mm, the solder 143 may mainly flow toward the cap-up 141 during a reflow process. Wettability of the solder 143 with respect to the cap-up 141 may be higher than that of the solder 143 with respect to the PTC device 142 (for example, the device portion 142a), and the solder 143 may mainly flow toward the cap-up 141, rather than toward the PTC device 142, during the reflow process. Therefore, even if the width of the interior space 141b is smaller than about 0.1 mm, the solder 143 may rarely flow up to an unwanted region of the PTC device 142 and/or the safety plate 144.

As described above, the solder or solder paste 143 may be coated between the cap-up 141 and the PTC device 142m followed by reflowing, and the cap-up 141 and the PTC device 142 may be integrally formed. The electrolyte and moisture may not penetrate into a portion between the cap-up 141 and the PTC device 142, an oxidation layer may not be generated, and resistance of the cap assembly 140 may be prevented from increasing.

A coating area and/or a coating amount of the solder or solder paste 143 may be optimized, and the solder or solder paste 143 may prevent direct short-circuits from being generated between the cap-up 141 and an unwanted region of the PTC device 142 (for example, the bottom conductive pattern 142c) and/or the cap-up 141 and the safety plate 144, and component cracks and/or sealing failures, for example, due to bending, may be suppressed during a crimping process.

As described above, the solder or solder paste 143 may be coated on the cap-up 141 or the PTC device 142. That is, by way of example and not limitation, in an embodiment, the solder or solder paste 143 may be pre-plated on the cap-up 141 or the PTC device 142.

Figure 3:
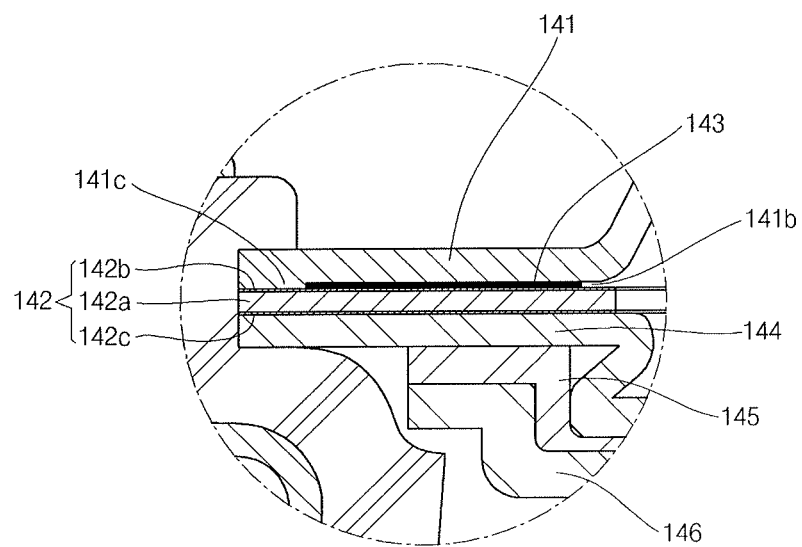
FIG. 3 illustrates an enlarged cross-sectional view of a cylindrical lithium ion secondary battery according to an embodiment.

Referring to FIG. 3, an enlarged cross-sectional view of a cylindrical lithium ion secondary battery according to an embodiment is illustrated.

As illustrated in FIG. 3, the cap-up 141 may further include an exterior stepped portion 141c protruding toward the exterior space 141a and making contact with the PTC device 142. The exterior stepped portion 141c protruding toward the exterior space 141a may protrude toward the PTC device 142 by a predetermined length from the external circumference of the cap-up 141.

A horizontal length or width of the exterior stepped portion 141c may be equal to that of the exterior space 141a. In an example embodiment, the length of the exterior stepped portion 141c may be in a range of about 0.1 mm to about 1.5 mm. The length of the exterior stepped portion 141c may be smaller than about 0.1 mm or may be greater than about 1.5 mm.

A thickness of the exterior stepped portion 141c may be equal to that of the solder 143. In an example embodiment, the thicknesses of the exterior stepped portion 141c and the solder 143 may be in a range of about 0.01 mm to about 0.03 mm.

The exterior stepped portion 141c may prevent the solder 143 from flowing to the external circumferences of the cap-up 141 and the PTC device 142 during reflowing.

The exterior stepped portion 141c of the cap-up 141 may be directly electrically connected to the top conductive pattern 142b of the PTC device 142.

As described above, the exterior stepped portion 141c may be further formed on a region corresponding to the exterior space 141a, and the solder 143 may not flow to the external circumferences of the cap-up 141 and the PTC device 142 during reflowing (for example, the exterior stepped portion 141c may serve as a dam for preventing the solder 143 from flowing out during reflowing). Accordingly, an electric short-circuit may be prevented from occurring between the cap-up 141 and an unwanted region of the PTC device 142 (for example, the bottom conductive pattern 142c) and/or between the cap-up 141 and the safety plate 144. The solder 143 and the exterior stepped portion 141c may maintain the cap-up 141 at a perfectly or substantially planar state during a crimping process, and component cracks and/or sealing failures, for example, due to bending, may be suppressed from occurring.

The exterior stepped portion 141c may be formed on the top conductive pattern 142b of the PTC device 142, rather than on the cap-up 141. The region corresponding to the exterior space 141a may be plated for a relatively long time during a plating process for forming the top conductive pattern 142b, and the exterior stepped portion 141c may be formed relatively thickly on the region corresponding to the exterior space 141a to extend from the top conductive pattern 142b to the cap-up 141. The exterior stepped portion 141c may make close contact with the cap-up 141. The effects exerted by the exterior stepped portion 141c upwardly protruding from the top conductive pattern 142b of the PTC device 142 may be the same as described above.

Figure 4:
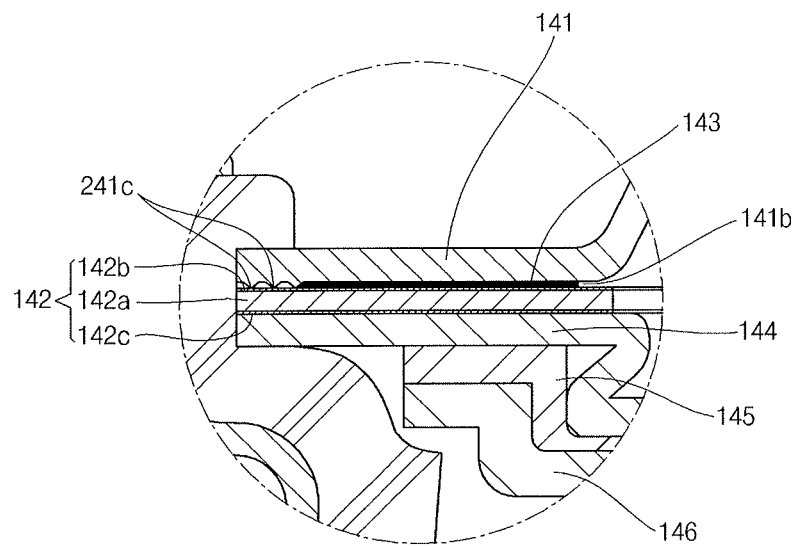
FIG. 4 illustrates an enlarged cross-sectional view of a cylindrical lithium ion secondary battery according to an embodiment.

Referring to FIG. 4, an enlarged cross-sectional view of a cylindrical lithium ion secondary battery according to an embodiment is illustrated.

As illustrated in FIG. 4, the exterior stepped portion 241c formed in the cap-up 141 may include a plurality of exterior stepped portions. In an example embodiment, the exterior stepped portion 241c may be in the shape of, e.g., include, a plurality of serrations, e.g., protrusions. For example, the exterior stepped portion 241c may be in the shape of an inverted triangle having a width gradually decreasing toward the PTC device 142.

As described above, the plurality of exterior stepped portions 241c may be formed on the region corresponding to the exterior space 141a, the solder 143 may not flow to the external circumferences of the cap-up 141 and the PTC device 142 during reflowing, and an electric short-circuit may be prevented. The solder 143 and the exterior stepped portion 241c may maintain the cap-up 141 at, e.g., in, a planar state during a crimping process, and component cracks and/or sealing failure, for example, due to bending, may be suppressed from occurring.

The stepped portions 141c and 241c of the cap-up 141 may be formed by a metal processing process, such as, for example, casting, forging, rolling, or punching.

Figure 5:
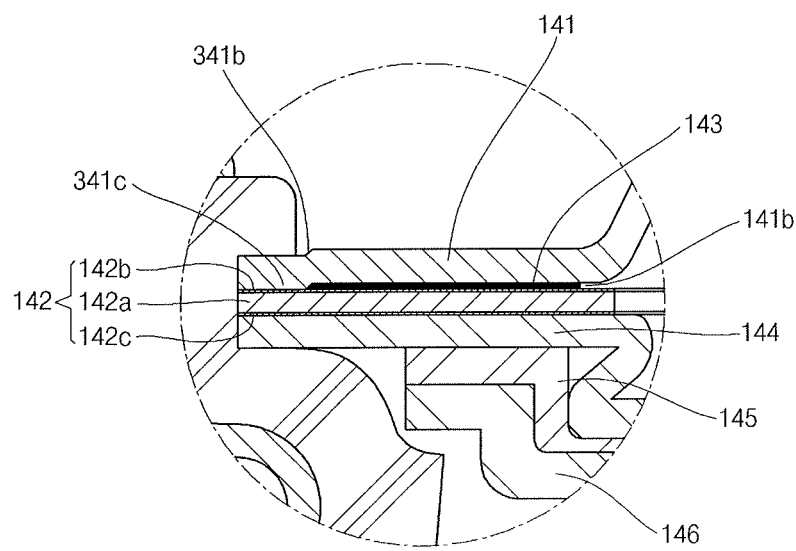
FIG. 5 illustrates an enlarged cross-sectional view of a cylindrical lithium ion secondary battery according to an embodiment.

Referring to FIG. 5, an enlarged cross-sectional view of a cylindrical lithium ion secondary battery according to an embodiment is illustrated.

As illustrated in FIG. 5, a top surface of the cap-up 141 corresponding to the PTC device 142 may be substantially bent. For the purpose of forming an exterior stepped portion 341c, the cap-up 141 corresponding to the exterior space 141a may be bent by a predetermined angle, and the top surface of the cap-up 141 corresponding to the exterior stepped portion 341c may be positioned to be lower than the top surface of the cap-up 141 corresponding to the solder 143. A region of the cap-up 141, corresponding to a boundary between the exterior stepped portion 341c and the solder 143, may be defined as a bent portion 341b.

The exterior stepped portion 341c may still make direct contact with the top conductive pattern 142b of the PTC device 142, and the solder 143 may be prevented from flowing during reflowing.

The exterior stepped portion 341c and/or the bent portion 341b of the cap-up 141 may be formed by a metal processing proves, such as, for example, pressing.

As described above, the exterior stepped portion 341c and/or the bent portion 341b of the cap-up 141 may be provided in the cap-up 141, and component cracks and/or sealing failures, for example, due to generation of an oxidation layer, an increase in the resistance, a short circuit, or bending, may be suppressed.

Unlike in the embodiment shown in FIG. 5, in the embodiment shown in FIGS. 2 to 4, the top surface of the cap-up 141 corresponding to the PTC device 142 may be perfectly or substantially planar.

Figure 6A:
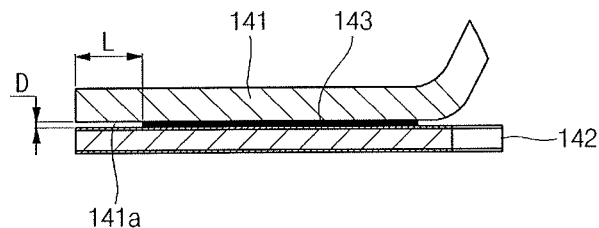
FIGS. 6A and 6B illustrate enlarged cross-sectional views of the relationship between each of a cap-up, a positive temperature coefficient (PTC) device and solder.
Figure 6B:
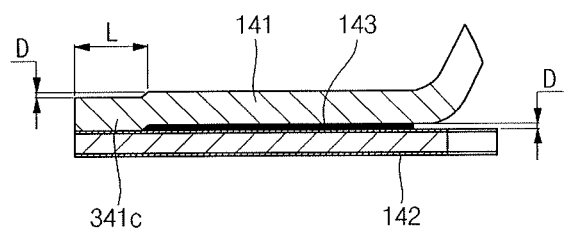

Referring to FIGS. 6A and 6B, enlarged cross-sectional views of the relationship between each of a cap-up (141), a positive temperature coefficient (PTC) device (142) and solder (143) are illustrated.

As illustrated in FIG. 6A, a length (width) of the exterior space 141a may be denoted by L and a thickness of the solder 143 may be denoted by D. As described above, the thickness of the solder 143, i.e., D, may be in a range of about 0.01 mm to about 0.03 mm.

The following Example and Comparative Example are provided in order to highlight characteristics of one or more embodiments, but it will be understood that the Example and Comparative Example are not to be construed as limiting the scope of the embodiments, nor is the Comparative Example to be construed as being outside the scope of the embodiments. Further, it will be understood that the embodiments are not limited to the particular details described in the Example and Comparative Example.

As listed in Table 1, to form the exterior space 141a having a length equal to L, the solder or solder paste 143 was coated on the cap-up 141 or/and the PTC device 142, followed by reflowing, and component resistance failures and crimping failures were investigated.

The component resistance failure refers to the solder 143 flowing up to external circumferences of the cap-up 141 and the PTC device 142 during reflowing, to make the solder 143 directly short-circuited to an unwanted region of the PTC device 142 (for example, a bottom conductive pattern) or/and the safety plate 144.

The crimping failure refers to the cap-up 141 and/or the PTC device 142 being bent while crimping a can and an insulation gasket and the interior of the secondary battery not being sealed.

TABLE 1

| Length (L: mm) | Component resistance failures (Short failures/Total Number of Samples Tested) | Crimping failures (Sealing pressure: [kgf/cm$^2$]) |
| --- | --- | --- |
| 0.0~0.05 | 21/100 | 0/20 |
| 0.05~0.1 | 7/100 | 0/20 |
| 0.1~0.2 | 0/100 | 0/20 |
| 0.2~0.3 | 0/100 | 0/20 |
| 0.3~0.5 | 0/100 | 0/20 |
| 0.5~0.7 | 0/100 | 0/20 |
| 0.7~0.9 | 0/100 | 0/20 |
| 0.9~1.1 | 0/100 | 0/20 |
| 1.1~1.3 | 0/100 | 0/20 |
| 1.3~1.4 | 0/100 | 0/20 |
| 1.4~1.5 | 0/100 | 0/20 |
| 1.5~1.55 | 0/100 | 3/20 |
| 1.55~1.6 | 0/100 | 7/20 |

As listed in Table 1, when the length L of the exterior space 141a was in a range of about 0 mm to about 0.1 mm, component resistance failures (for example, short failures) were generated in 28 among 200 samples.

When the length L of the exterior space 141a was in a range of about 1.5 mm to about 1.6 mm, crimping failures (for example, sealing failures) were generated in 10 among 40 samples.

Therefore, an appropriate length (width) L of the exterior space 141a may be in a range of about 0.1 mm to about 1.5 mm.

As illustrated in FIG. 6B, when the exterior stepped portion 141c is formed on the region corresponding to the exterior space 141a, a probability of generating component resistance failures and crimping failures may be further lowered.

If the length L of the exterior space 141a is smaller than 0.1 mm, existence of the exterior stepped portion 141c may prevent component resistance failures from being generated, unlike in the embodiment illustrated in FIG. 6A in which component resistance failures may be generated. If the length L of the exterior space 141a is greater than 1.5 mm, existence of the exterior stepped portion 141c may prevent crimping failures from being generated, unlike in the embodiment illustrated in FIG. 6A in which crimping failures may be generated.

The investigation results are listed in Table 2.

TABLE 2

| | Component resistance failures (Short failures/Total Number of Samples Tested) | Crimping failures (Sealing pressure: [kgf/cm$^2$]) |
| --- | --- | --- |
| Use of exterior stepped portion | 0/100 | 0/20 |
| Non-use of exterior stepped portion | 21/100 | 4/20 |

When an exterior stepped portion was used, no component resistance failure was generated among 100 samples and no crimping failure was generated among 20 samples. When an exterior stepped portion was not used, 21 component resistance failures were generated among 100 samples and 4 crimping failure were generated among 20 samples.

Figure 7:
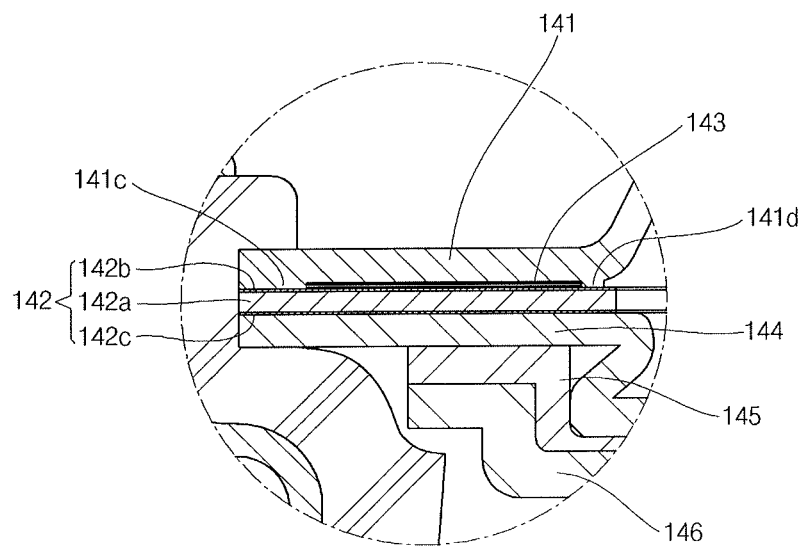
FIG. 7 illustrates an enlarged cross-sectional view of a cylindrical lithium ion secondary battery according to an embodiment.

Referring to FIG. 7, an enlarged cross-sectional view of a cylindrical lithium ion secondary battery according to an embodiment is illustrated.

As illustrated in FIG. 7, an interior stepped portion 141d may further be formed along internal circumferences of the cap-up 141 and the PTC device 142. The cap-up 141 may further include the interior stepped portion 141d protruding toward the PTC device 142 and making contact with the PTC device 142.

As described above, the interior stepped portion 141d may prevent the solder 143 from flowing up to interior circumferences of the cap-up 141 and the PTC device 142 during reflowing, and component cracks and/or sealing failures, for example, due to generation of an oxidation layer, an increase in the resistance, a short circuit, or bending, may be suppressed from occurring.

Figure 8A:
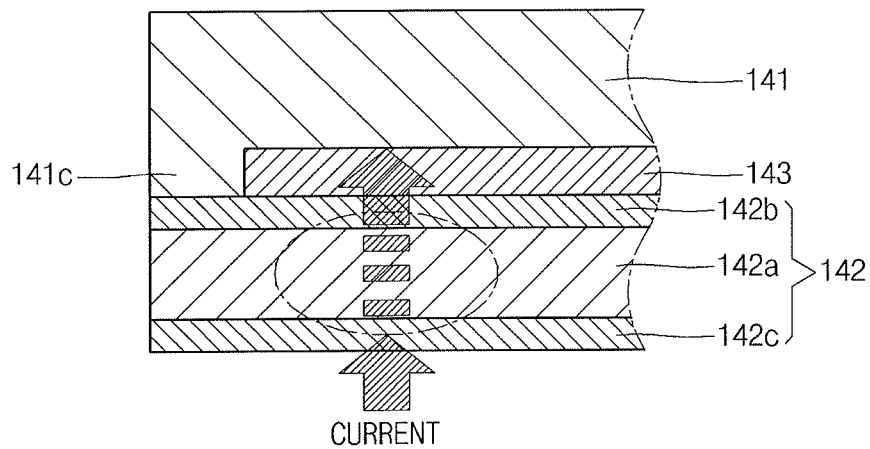
FIGS. 8A and 8B illustrate views of operations of a positive temperature coefficient (PTC) device according to normal or abnormal coating of a solder paste.
Figure 8B:
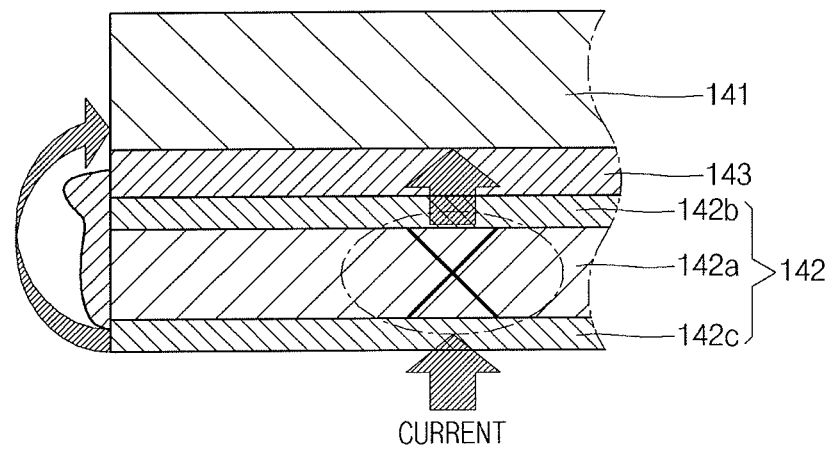

Referring to FIGS. 8A and 8B, operations of a positive temperature coefficient (PTC) device according to normal or abnormal coating of a solder are illustrated.

As illustrated in FIG. 8A, when the cap-up 141 includes the exterior stepped portion 141c and the solder 143 is normally coated and reflowed, the PTC device 142 may be tripped when the temperature of the secondary battery rises, and current or over-current may be cut off.

As illustrated in FIG. 8B, when the cap-up 141 does not include the exterior stepped portion 141c and the solder 143 is not normally coated and reflowed (for example, when there is no exterior space), the solder 143 may make the top conductive pattern 142b and the bottom conductive pattern 142c of the PTC device 142 directly short-circuited, the PTC device 142 may be prevented from being tripped when the temperature of the secondary battery rises, and current or over-current may be prevented from being cut off. When the temperature of the secondary battery rises, the current or over-current may flow to the cap-up 141 while by-passing the PTC device 142, and the secondary battery may become unstable.

Figure 9A:
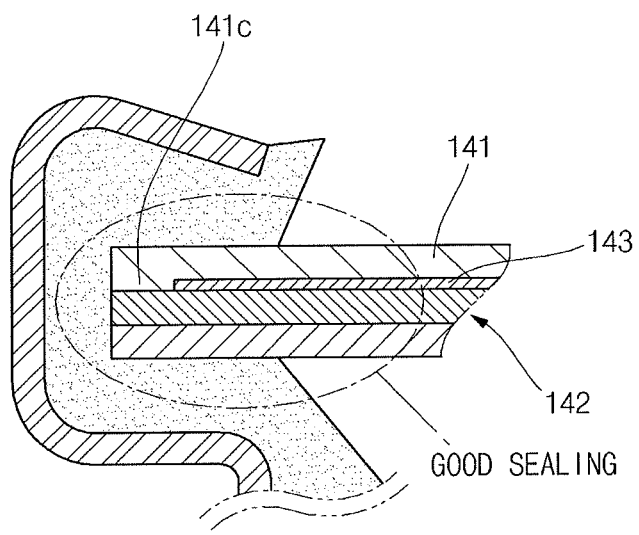
FIGS. 9A and 9B illustrate views of sealing operations according to normal or abnormal coating of a solder paste.
Figure 9B:
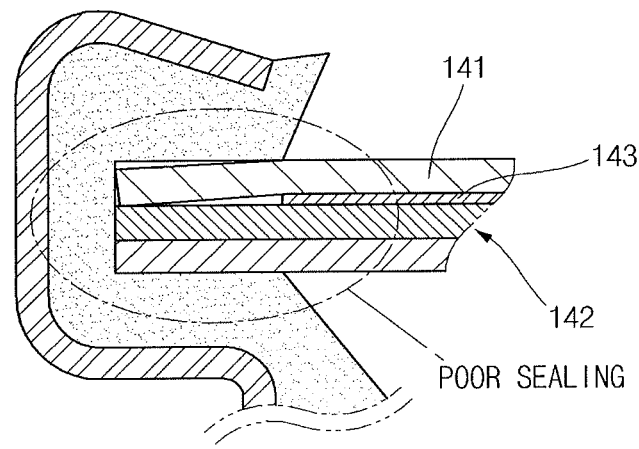

Referring to FIGS. 9A and 9B, sealing operations according to normal or abnormal coating of a solder paste are illustrated.

As illustrated in FIG. 9A, when the cap-up 141 includes the exterior stepped portion 141c and the solder 143 is normally coated and reflowed, each component may maintain a good degree of planarity during crimping, and excellent sealing efficiency of the secondary battery may be achieved.

As illustrated in FIG. 9B, when the cap-up 141 does not include the exterior stepped portion 141c and an excessively large exterior space is provided, the planarity of each component may not be maintained during crimping, and the sealing efficiency of the secondary battery may be lowered.

Figure 10:
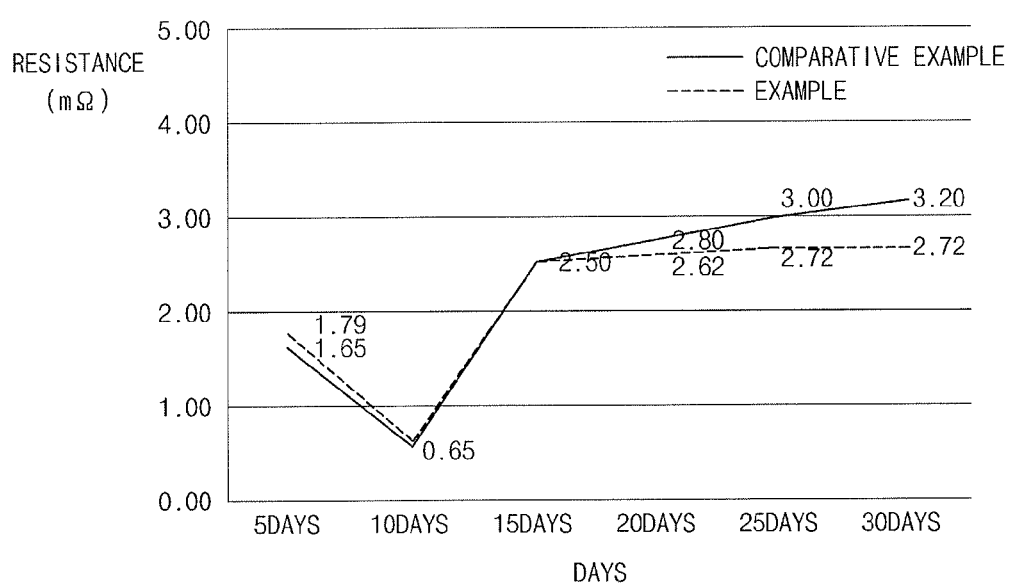
FIG. 10 illustrates a graph of resistance variations after an exemplary lithium ion secondary battery is maintained under constant-temperature and constant-humidity conditions.

Referring to FIG. 10, resistance variations after an exemplary lithium ion secondary battery is maintained under constant-temperature and constant-humidity conditions are illustrated.

The X-axis indicates the number of days during which an integrated assembly of the cap-up 141 and the PTC device 142 was left undisturbed, and the Y-axis indicates resistance values of the integrated assembly of the cap-up 141 and the PTC device 142. The integrated assembly of the cap-up 141 and the PTC device 142 was left undisturbed under the conditions of 60° C. in temperature and 95% in humidity.

In the Example, an integrated assembly of the cap-up 141 and the PTC device 142 was used, the cap-up 141 having an exterior space 141a having a length in a range of 0.1 mm to 1.5 mm. In the Comparative Example, a separate type assembly of a cap-up and a PTC device (without solder) was used. Results are summarized in Table 3.

TABLE 3

| Resistance variations [mΩ] under constant-temperature and constant-humidity conditions | | | | | | |
|---|---|---|---|---|---|---|
| | 5 days | 10 days | 15 days | 20 days | 25 days | 30 days |
| Comparative Example | 1.65 | 0.60 | 2.50 | 2.80 | 3.00 | 3.20 |
| Example | 1.79 | 0.65 | 2.53 | 2.62 | 2.72 | 2.72 |

As shown in FIG. 10 and Table 3, after being maintained under constant-temperature and constant-humidity conditions, the secondary battery according to Example had superior resistance variations to the secondary battery according to the Comparative Example. In the Comparative Example, the resistance variation of the secondary battery increased as the time in which it was left undisturbed increased. In the Example, the resistance variation of the secondary battery was saturated to a predetermined value without being further increased.

By way of summation and review, a lithium ion secondary battery may be classified as, for example, a cylindrical secondary battery, a prismatic secondary battery, or a pouch type secondary battery. For example, a cylindrical lithium ion secondary battery may include a cylindrical electrode assembly, a cylindrical can coupled to the electrode assembly, an electrolyte injected into the can to allow movement of lithium ions, and a cap assembly coupled to one side of the can to prevent leakage of the electrolyte and separation of the electrode assembly.

Provided is a cylindrical lithium ion secondary battery, which may optimize a coating area and/or a coating amount of a solder or solder paste between a cap-up and a positive temperature coefficient (PTC) device constituting a cap assembly, and component cracks and/or sealing failure, for example, due to generation of an oxidation layer, an increase in the resistance, a short circuit, or bending, may be suppressed.

Also provided is a cylindrical lithium ion secondary battery, which may include a stepped portion and/or a bent portion formed in a cap-up, and component cracks and/or sealing failure, for example, due to generation of an oxidation layer, an increase in the resistance, a short circuit, or bending, may be suppressed.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A cylindrical lithium ion secondary battery, comprising:
a cylindrical can;
an electrode assembly in the cylindrical can with an electrolyte solution; and
a cap assembly sealing the cylindrical can,
the cap assembly including a positive temperature coefficient (PTC) device connected to the electrode assembly, a cap-up connected to the PTC device, solder between the PTC device and the cap-up, and an exterior space without the solder on external circumferences of the PTC device and the cap-up, wherein the cap-up includes an exterior stepped portion protruding toward the exterior space and contacting the PTC device.

2. The cylindrical lithium ion secondary battery as claimed in claim 1, wherein the exterior space has a width in a range of 0.1 mm to 1.5 mm.

3. The cylindrical lithium ion secondary battery as claimed in claim 1, wherein a width of the exterior stepped portion is equal to that of the exterior space.

4. The cylindrical lithium ion secondary battery as claimed in claim 1, wherein the exterior stepped portion includes a plurality of stepped portions spaced apart from each other.

5. The cylindrical lithium ion secondary battery as claimed in claim 1, wherein the exterior stepped portion includes a plurality of serrations.

6. The cylindrical lithium ion secondary battery as claimed in claim 1, wherein a top surface of the cap-up corresponding to the PTC device is planar.

7. The cylindrical lithium ion secondary battery as claimed in claim 1, wherein a top surface of the cap-up corresponding to the PTC device is bent.

8. The cylindrical lithium ion secondary battery as claimed in claim 1, wherein the cap assembly further includes an interior space without solder on internal circumferences of the PTC device and the cap-up.

9. The cylindrical lithium ion secondary battery as claimed in claim 8, wherein the cap-up includes an interior stepped portion protruding toward the interior space and contacting the PTC device.

* * * * *